United States Patent [19]

Siegenthaler et al.

[11] Patent Number: 5,141,590
[45] Date of Patent: Aug. 25, 1992

[54] APPARATUS FOR MANUFACTURING AND FEEDING TIRE BEADS ONTO AN AUTOMOTIVE TIRE BUILDING DRUM

[75] Inventors: Karl J. Siegenthaler; Carlo Giorgetti, both of Rome, Italy

[73] Assignee: Bridgestone/Firestone, Inc., Akron, Ohio

[21] Appl. No.: 624,429

[22] Filed: Dec. 7, 1990

[30] Foreign Application Priority Data

Dec. 22, 1989 [IT] Italy ................ 68171 A/89

[51] Int. Cl.⁵ ................ B29D 30/48; B21F 37/00
[52] U.S. Cl. ................ 156/422; 156/136; 156/403; 156/446; 242/7.01; 242/7.19; 414/225; 901/8
[58] Field of Search ............... 156/131, 136, 398, 422, 156/403, 406.2, 446, 460; 242/7.01, 7.19; 414/225; 245/1.5; 901/8

[56] References Cited

U.S. PATENT DOCUMENTS

| | | | |
|---|---|---|---|
| 1,957,981 | 5/1934 | Shook | 156/403 |
| 1,986,094 | 1/1935 | Allan | 156/422 X |
| 3,076,617 | 2/1963 | Lang | 242/56 R |
| 3,741,262 | 6/1973 | Bell et al. | 245/1.5 X |
| 3,982,989 | 9/1976 | Badenkov et al. | 156/403 |
| 4,075,048 | 2/1978 | Lupton et al. | 156/422 X |
| 4,264,387 | 4/1981 | Allitt | 156/131 |
| 4,369,086 | 1/1983 | Nakahama et al. | 156/403 |
| 4,877,468 | 10/1989 | Siegenthaler | 156/133 X |

FOREIGN PATENT DOCUMENTS

| | | |
|---|---|---|
| 0240973 | 10/1987 | European Pat. Off. . |
| 3509025 | 9/1986 | Fed. Rep. of Germany . |
| 6105948 | 1/1980 | Japan . |
| 479656 | 8/1975 | U.S.S.R. ............... 156/403 |
| 897575 | 1/1982 | U.S.S.R. ............... 156/398 |

Primary Examiner—John J. Gallagher
Attorney, Agent, or Firm—Ernst H. Ruf

[57] ABSTRACT

An apparatus for manufacturing automotive tire beads wherein a pair of bead winding and transfer units for forming respective beads each present an inner ring which defines part of a bead winding unit for winding a continuous metal wire constituting the respective bead, and consists of two coaxial rotatable annular bodies designed to move between a detached and mated position; and an outer grip ring consisting of a number of segments designed to move back and forth in relation to the inner ring; which segments are carried on an annular support designed to move both transversely, between a position coaxial with the respective inner ring and a position coaxial with a tire building drum, and axially along the tire building drum.

14 Claims, 7 Drawing Sheets

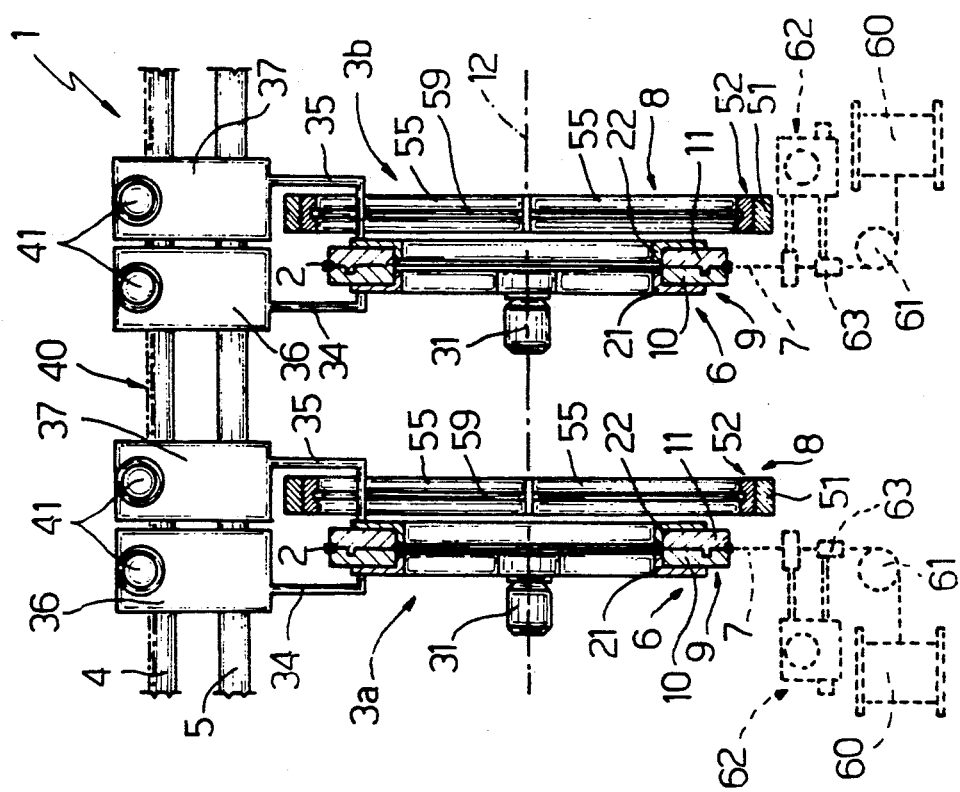
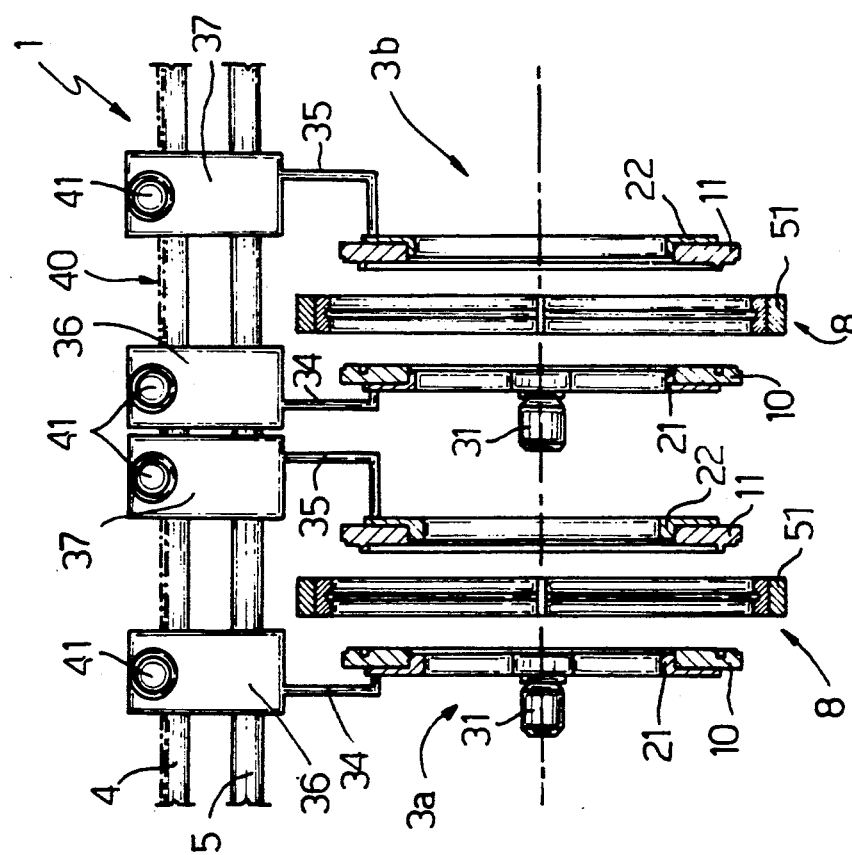

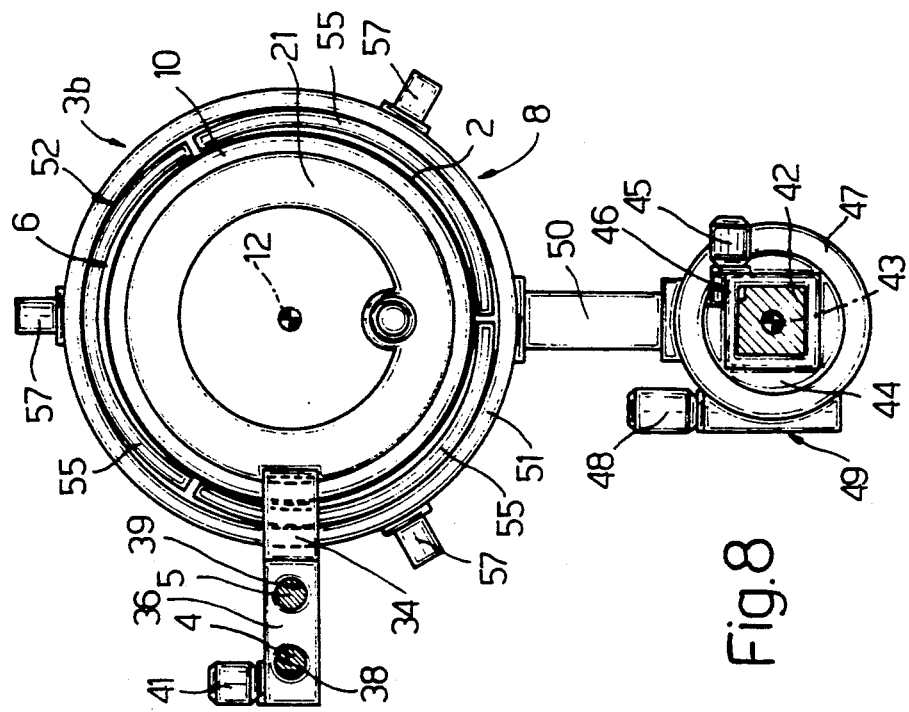

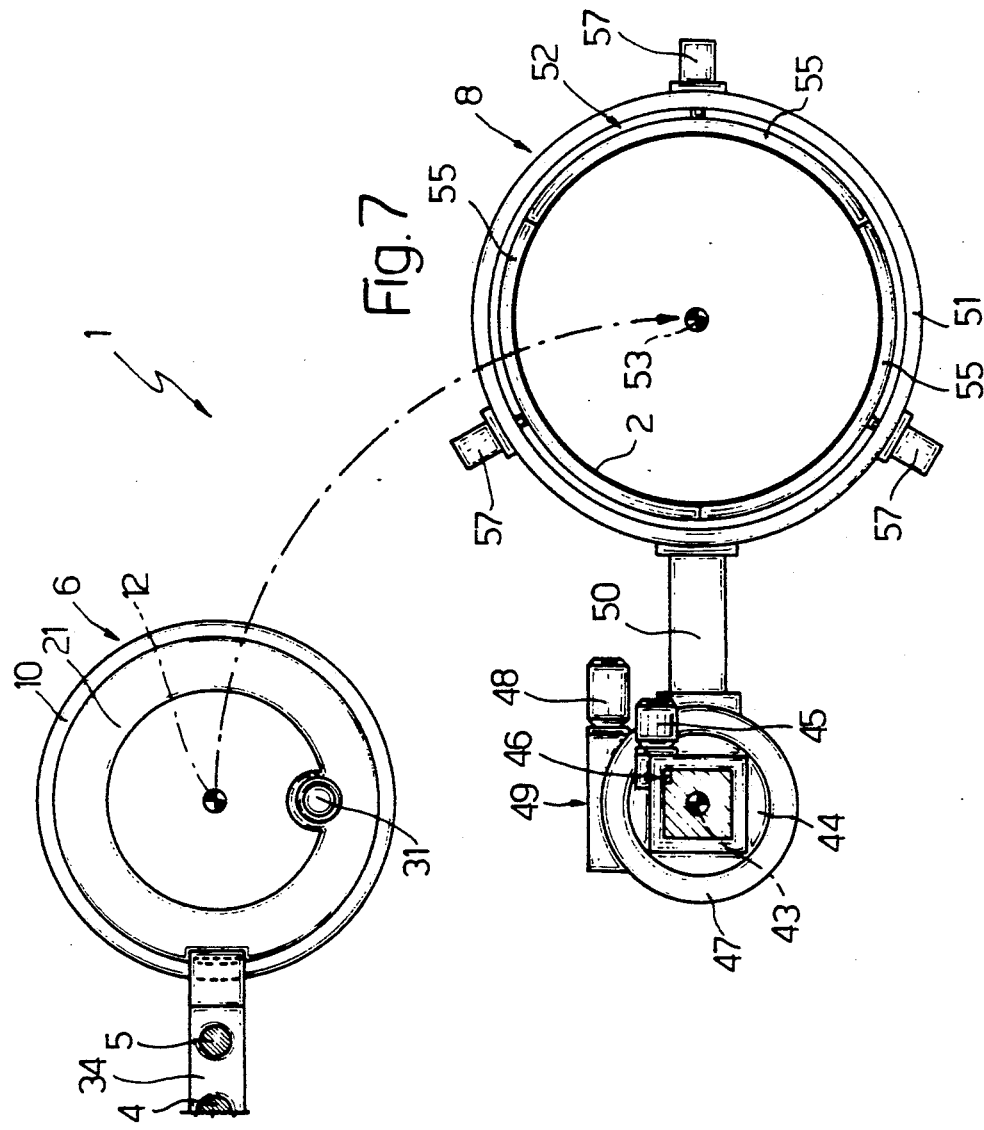
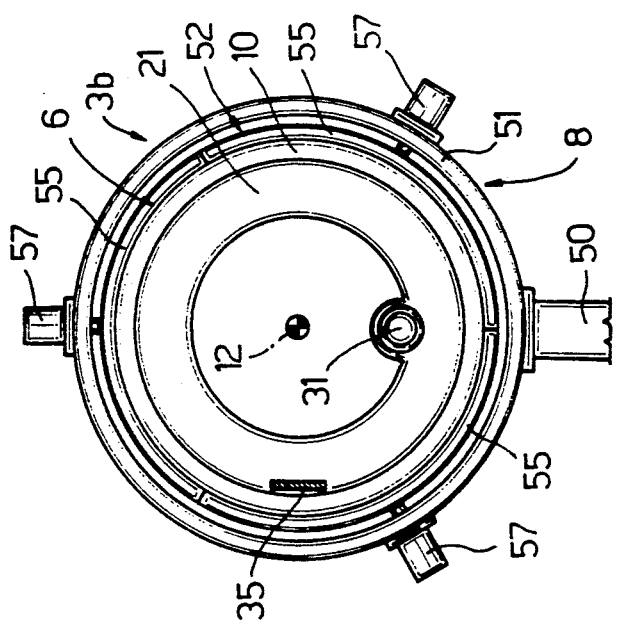

APPARATUS FOR MANUFACTURING AND FEEDING TIRE BEADS ONTO AN AUTOMOTIVE TIRE BUILDING DRUM

TECHNICAL FIELD

The present invention relates to an apparatus for manufacturing and feeding tire beads onto an automotive tire building drum.

BACKGROUND OF THE ART

In particular, the present invention relates to an apparatus for manufacturing and automatically feeding onto a tire building drum pairs of beads preferably, but not exclusively, of the type described and claimed in U.S. patent application Ser. No. 07/624,421, filed concurrently with the present Application, the content of which is fully incorporated herein by reference, and which relates to an automotive tire bead consisting of a substantially circular-section annular element formed from a continuous metal wire, usually a continuous metal cable, wound in such a manner as to form a number of packed coils. Said coils are arranged over the substantially circular section of said annular element according to a predetermined law, program or sequence and are held together by an outer flexible packing member of heat-shrinkable material coiled or wound about said annular element.

DISCLOSURE OF THE INVENTION

According to the present invention, there is provided an apparatus for manufacturing automotive tire beads, and comprising two mobile bead winding and transfer units for forming said respective beads; characterized by the fact that each bead winding and transfer unit comprises a bead winding unit for winding a continuous metal wire constituting a respective bead, and a bead transfer unit for housing and gripping said bead; each bead winding unit comprising an inner ring consisting of two coaxial rotatable annular bodies, a first supporting element for each annular body, first actuating means for moving said two first supporting elements between a first position, wherein said two rotatable annular bodies are mated, and a second position wherein said two rotatable annular bodies are axially detached; each bead transfer unit for housing and gripping said bead comprising a second supporting element, an outer ring comprising a number of segments carried on said second supporting element, second actuating means for moving said segments radially in relation to said second supporting element, and third actuating means for moving said second supporting element both transversely, between a third position wherein said outer ring is coaxial with said two rotatable annular bodies, and a fourth position wherein said outer ring is coaxial with a tire building drum, and axially along said tire building drum.

Each rotatable annular body is preferably mounted for rotation on a respective first supporting element; fifth actuating means being provided for turning said rotatable annular bodies about a common axis in relation to said respective first supporting elements.

A non-limiting embodiment of the present invention will now be described by way of example with reference to the accompanying drawings.

BRIEF DESCRIPTION OF THE DRAWINGS

FIGS. 2 to 6 show schematic top plan views, with parts removed for simplicity, of the FIG. 1 apparatus in various operating positions;

FIG. 7 shows a section taken along line VII—VII in FIG. 1;

FIG. 8 shows a section taken along line VIII—VIII in FIG. 4;

FIG. 9 shows a section taken along line IX—IX in FIG. 5;

BEST MODE FOR CARRYING OUT THE INVENTION

Figure 1:
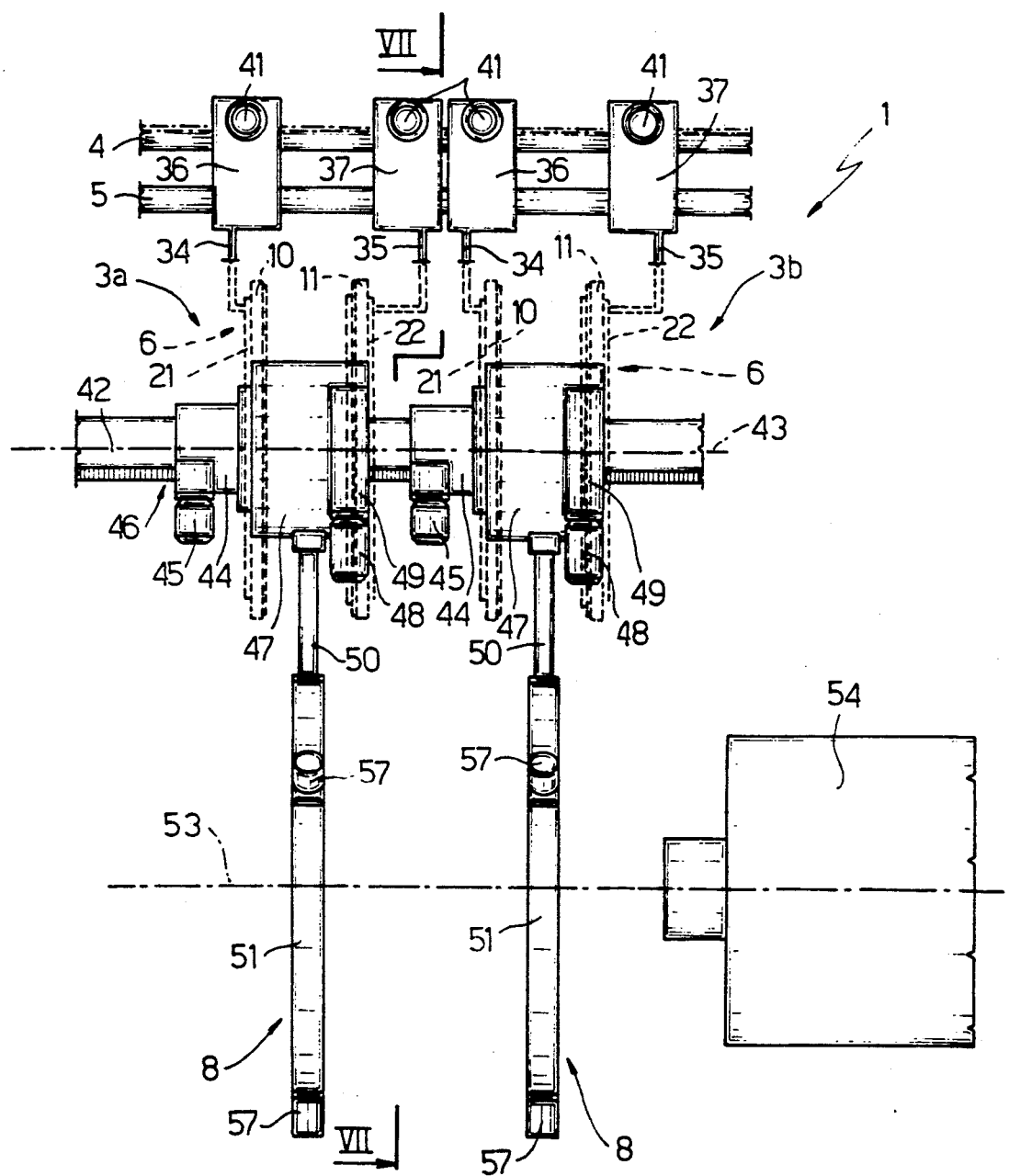
FIG. 1 shows a schematic front view of a preferred embodiment of the apparatus according to the present invention in the final operating position.

Number 1 in FIG. 1 indicates an apparatus for manufacturing automotive tire beads 2, (FIG. 3) with apparatus 1 comprising a pair of bead wind and transfer units 3, numbered respectively 3a and 3b, for forming respective beads 2, and running along a pair of parallel, substantially horizontal guides 4 and 5. Each bead winding and transfer unit 3 comprises a bead winding unit 6 for winding a continuous metal wire 7 (FIG. 3) constituting a respective bead 2, and a bead transfer unit 8 for housing and gripping finished bead 2.

Figure 10:
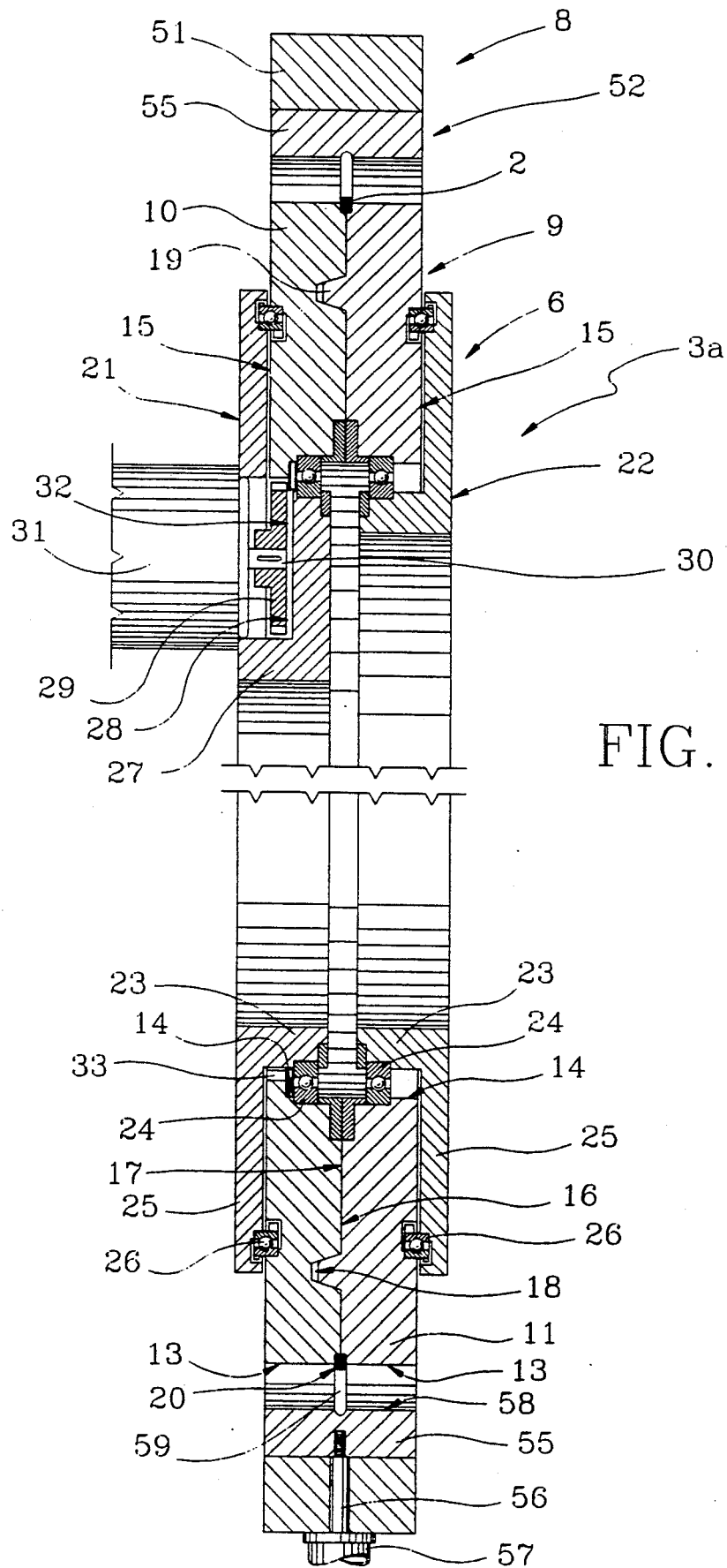
FIG. 10 shows a section taken along line X—X in FIG. 4.

As shown in FIG. 10, each bead winding unit 6 comprises a matching pair of rotatable annular bodies indicated generally at a matching pair 9 consisting of rotatable annular bodies 10 and 11 having a common axis 12 (FIG. 3) parallel to guides 4 and 5 and lying substantially in the same horizontal plane defined by same. Annular bodies 10 and 11 are substantially cylindrical, and each is defined by a substantially cylindrical outer surface 13, a substantially cylindrical inner surface 14 coaxial with outer surface 13, and an annular outer lateral surface 15. Annular bodies 10 and 11 are also defined by respective inner annular lateral surfaces 16 and 17 designed to mate with each other; said surface 16 presenting an annular groove 18 coaxial with axis 12 and of substantially trapezoidal section; and said surface 17 presenting an annular centering rib 19 having a section designed to engage and mate with groove 18.

At the radius between surfaces 13 and 16 on rotatable annular body 10 and surfaces 13 and 17 on rotatable annular body 11, each rotatable annular body 10 and 11 presents an annular groove having a section substantially in the form of a quarter arc of a circle, and defining, with the corresponding groove on the other annular body 11 and 10, and when surfaces 16 and 17 are arranged contacting each other, an annular groove 20 extending along the center line of inner ring 9 and designed to receive part of bead 2, the remainder of which extends radially outwardly of inner ring 9.

Bead winding unit 6 also comprises two supporting elements or non-annular rotatable supports 21 and 22 respectively supporting annular bodies 10 and 11 in rotatable manner, and each comprising a non-rotatable tubular body 23 connected to surface 14 of respective annular body 10, 11 via the interposition of a bearing 24, and an outer radial end flange 25 connected to surface 15 of respective annular body 10, 11 via the interposition of a bearing 26.

Tubular body 23 of non-rotatable annular support 21 presents an inner radial appendix 27 having an outer cavity 28 parallel to axis 12 and housing a pinion 29 fitted on to the output shaft 30 of a motor 31 parallel to axis 12 and supported on annular support 21. A slot 32 formed through non-rotatable tubular body 23 of annular support 21 at cavity 28 enables pinion 29 to engage a ring gear 33 extending radially inwardly from surface 14 of rotatable annular body 10.

Annular supports 21 and 22 present respective substantially L-shaped outer brackets 34 and 35 (FIG. 4) whereby they are integrally connected to respective slides 36 and 37 running along guides 4 and 5. As shown, for example, in FIG. 8, each slide 36, 37 presents two through holes 38 and 39 engaged in a sliding manner by guides 4 and 5. Moreover, guide 4 presents an outer rack 40, and each of slides 36 and 37 supports a reversible electric motor 41 driving a respective sprocket (not shown) engaging rack 40 for moving respective slide 36, 37 along guides 4 and 5 between a first position, wherein rotatable annular bodies 10 and 11 are mated, and a second position wherein annular bodies 10 and 11 are detached axially.

According to a variation (not shown), one of slides 36, 37 is mounted in a fixed position on guides 4 and 5, whereas the other is powered for moving respective rotatable annular body 10, 11 in relation to the other rotatable annular body 11, 10 between said two positions.

As shown in FIGS. 1 and 7, bead transfer units 8 comprise a common guide 42, parallel to guides 4 and 5, extending along an axis 43 parallel to axis 12, and defining, with axis 12, a plane perpendicular to that defined by guides 4 and 5. Guide 42 presents a substantially square section, and each bead transfer unit 8 comprises a slide 44 connected prismatically to guide 42, and supporting a reversible electric motor 45 connected to guide 42 via a rack-and-pinion connection 46, for bidirectionally moving slide 44 along guide 42. About slide 44, there is mounted for rotation, a tubular body 47, the angular position of which, in relation to slide 44, is regulated by a reversible electric motor 48, connected to slide 44 via a worm-and-helical-gear connection 49, for turning tubular body 47 about axis 43 and bidirectionally in relation to slide 44.

One end of a radial column 50 is integrally connected with the outer surface of tubular body 47, the other end of column 50 being connected to the outer surface of, a second annular support 51 supporting an outer ring 52. Annular support 51 is powered by motor 48 so as to move between a first position, wherein ring 52 is coaxial with axis 12, and a second position, wherein ring 52 is coaxial with axis 53 of a known tire building drum 54.

As shown in FIGS. 7 and 8, outer ring 52 consists of three segments 55, each connected (FIG. 10) to the output rod 56 of a respective hydraulic or pneumatic jack 57, supported on annular support 51, for moving respective segment 55 between a contracted position, wherein the ends of segments 55 substantially contact one another, and an expanded position wherein segments 55 are detached and substantially contact the linear inside surface of annular support 51. When contracted, segments 55 define ring 52, which presents a substantially cylindrical inner surface 58 of substantially the same diameter as surface 13. Along the center line of surface 58, there is formed an annular groove 59 extending over all of segments 55, of substantially semicircular section, and of the same diameter, as groove 20.

As the operation and timing of both bead winding and transfer units 3 are identical, operation of device 1 will be described with reference to mandrel 3a and commencing from the starting position shown in FIG. 1. Initially, slides 36 and 37 are positioned, on guides 4 and 5, so as to maintain rotatable annular bodies 10 and 11 separated by a distance at least equal to the thickness of outer ring 52 and annular support 51, which is positioned coaxial with axis 12 of annular bodies 10 and 11. As shown in FIG. 3, slide 37 is then moved towards slide 36 so as to move bracket 35, together with non-rotatable outer annular support 22 and annular body 11, forward through outer ring 52, so as to bring annular body 11 into contact with annular body 10. If necessary, slide 36 is then moved, together with slide 37, so as to move inner ring 9 in relation to outer ring 52 to uncover groove 20 and prevent access to the same from being impeded by outer ring 52. One end of metal wire 7 is then secured, in any known manner, to ring 9 and inside groove 20, and motor 31 is activated for turning inner ring 9 about axis 12 thereby coiling wire 7 along groove 20.

As shown in FIG. 3, wire 7, which is normally fed off a reel 60, is fed about a pulley 61 and into groove 20 through a known type of control unit 62 having an oscillating guide member 63 engaged by wire 7 and designed to oscillate, by virtue of a computer (not shown), in such a manner as to arrange wire 7 in coils extending along groove 20 and arranged in a given or predetermined order in relation to one another. Once wound, wire 7 is cut, and the finished bead 2 presents a given section, part of which is housed inside groove 20 and the remainder of which projects radially outwardly of inner ring 9.

Figure 4:
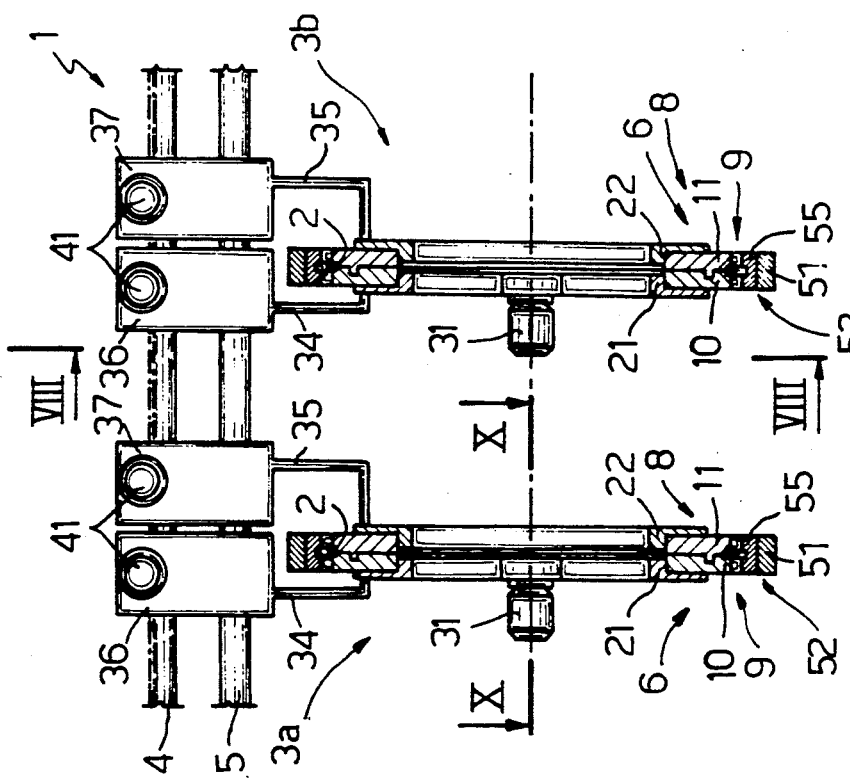

As shown in FIG. 4, via operation of motor 45, annular support 51, with segments 55 in the expanded position, is then moved along axis 12 and outwardly of ring 9, after which (FIG. 5), segments 55 are contracted so as to form ring 52 and receive, inside groove 59 of ring 52, the portion of bead 2 projecting outwardly of groove 20. At this point (FIG. 6), motors 41 are activated for separating rotatable annular bodies 10 and 11 thereby releasing finished bead 2 inside groove 59 of outer ring 52.

As shown in FIGS. 7 and 1, motor 48 is then activated for moving annular support 51 transversely from its current position, coaxial with axis 12, into a position wherein it is coaxial with axis 53 of tire building drum 54. Motor 45 is then operated for moving annular support 51, together with outer ring 52 and bead 2 housed therein, axially along axis 53, thus setting bead 2 in the assembly position on tire building drum 54. Successive operation of jacks 57 and motors 45, 48 provides for expanding segments 55, thus releasing bead 2 onto tire building drum 54, and for restoring annular support 51 to the cycle start position shown in FIG. 2.

Figure 12:
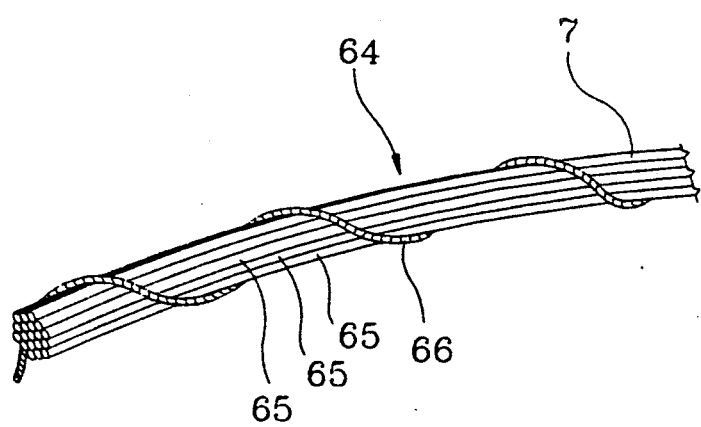
FIG. 12 shows a partial side view of the bead formed on the FIG. 11 apparatus.

Bead 2 produced on apparatus 1, as described above, may be any known type of "program" bead or, preferably, as already stated, of the type described and claimed in U.S. patent application Ser. No. 07/624,421 filed concurrently with the present application, and identified by numeral 64 in FIG. 12. As shown in FIG. 12, bead 64 is of substantially circular section, and is formed by winding wire 7 in such a manner as to form coils 65 packed together by a coiled outer flexible packing member 66 of heat-shrinkable material.

Figure 11:
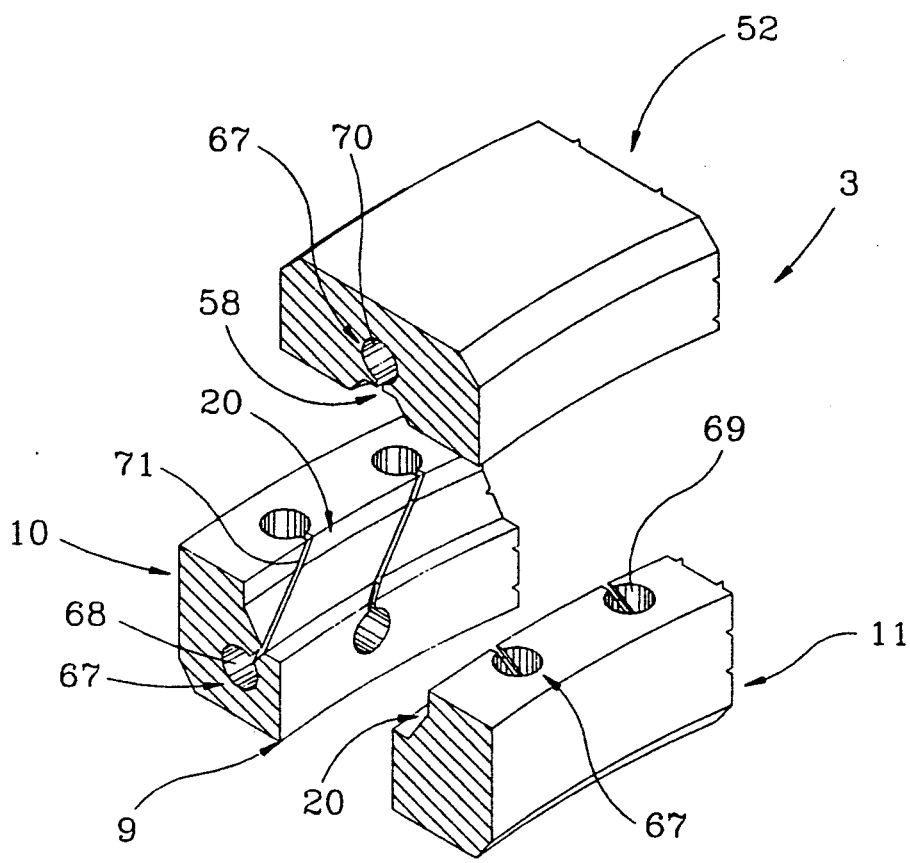
FIG. 11 shows an exploded partial view, in perspective, of a preferred embodiment of a detail of the FIG. 1 apparatus.

Bead 64, as previously described, is produced on apparatus 1 using bead winding and transfer units 3 as shown schematically in FIG. 11 and as described in U.S. patent application Ser. No. 07/624,437, now U.S. Pat. No. 5,099,892, filed concurrently with the present Application and the content of which is fully incorporated herein by reference.

Figure 5:
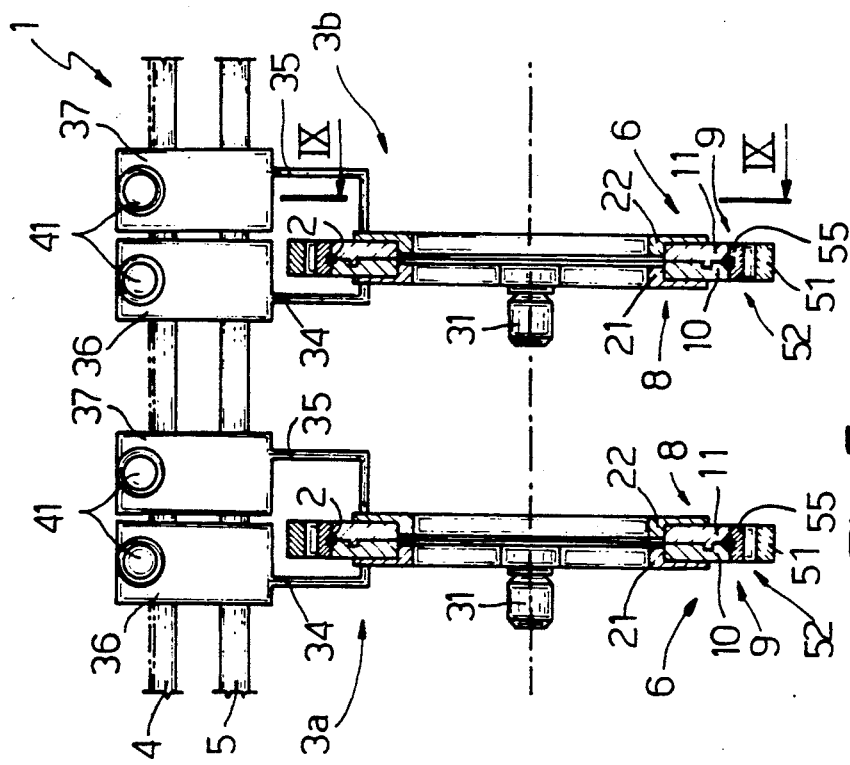

When rotatable annular bodies 10, 11 and segments 55 are arranged in a contacting manner, as shown in FIG. 5, bead winding and transfer unit 3 in FIG. 11 defines a circular duct consisting of grooves 20 and 58, for receiving coils 65 formed by wire 7; and a duct 67 coiled about said duct 20-58 and comprising portions 68 formed through rotatable annular body 10, portions 69 formed through rotatable annular body 11, and portions 70 formed through outer ring 52.

When rotatable annular bodies 10 and 11 and outer ring 52 are arranged in a contacting manner, as shown in FIG. 5, portions 68, 69 and 70 define duct 67 along which outer flexible packing member 66 is blown as described in previously-noted U.S. patent application Ser. No. 07/624,437, now U.S. Pat. No. 5,099,892. Flexible packing member 66 is brought into contact with coils 65 via a slot 71 extending over the entire length of duct 67 and located between duct 67 and the duct defined by grooves 20 and 58.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. An apparatus for manufacturing automotive tire beads comprising two inner mobile bead winding units for winding a continuous metal wire to form beads and two outer mobile bead transfer units for housing and gripping the beads after completion of winding; each of the inner bead winding units having a pair of coaxial rotatable annular bodies, a first non-rotatable annular supporting element for each of said rotatable annular bodies, and a pair of first actuating means for moving said first non-rotatable annular supporting elements between a first position, wherein said two rotatable annular bodies are mated, and a second position wherein said two rotatable annular bodies are axially detached; each of said outer bead transfer units for housing and gripping said beads comprising a second non-rotatable annular supporting element, a ring comprising a number of segments carried on said second non-rotatable annular supporting element, second actuating means for moving said segments radially in relation to said second supporting element, and third actuating means for moving said second supporting element both transversely, between a third position wherein said ring is coaxial with said two rotatable annular bodies, and a fourth position wherein said ring is coaxial with a tire building drum having an axis parallel with the axis of said rotatable annular bodies and offset therefrom, and axially along said tire building drum.

2. An apparatus as claimed in claim 1 in which each of said rotatable annular bodies is mounted for rotation on a respective one of said first non-rotatable annular supporting elements; and in which fourth actuating means is provided for rotating said rotatable annular bodies about a common axis in relation to said respective first non-rotatable annular supporting elements.

3. An apparatus as claimed in claim 1 including first slides integral with each of said first non-rotatable annular supporting elements, and first guide means extending parallel to the common axis of said rotatable annular bodies and connected to said first slides; and in which each of said first actuating means is carried by each of said first slides for moving same along said first guide means and said respective first non-rotatable annular supporting elements between said first and second positions.

4. An apparatus as claimed in claim 3, including second slides supporting a respective one of each of said outer bead transfer units, and second guide means extending parallel to the common axis of said rotatable annular bodies and to the axis of said tire building drum, and connected to said second slides; and in which one of said third actuating means is carried by each of said second slides, respectively.

5. An apparatus as claimed in claim 4 in which said third actuating means comprises a first and a second reversible motor; and in which each of said outer bead transistor units is connected to a respective one of said second slides so as to turn in relation to same about said second guide means and, by virtue of said first motor, between said third and fourth positions, so as to travel with said respective second slides along said second guide means by said second motor.

6. An apparatus as claimed in claim 5, in which said rotatable annular bodies present respective outer circumferential grooves, and the segments comprising said ring present respective portions of an inner circumferential groove; and in which said grooves define a first circular duct for receiving a number of coils of said metal wire when said rotatable annular bodies and said segments are arranged in a contacting relationship, with said annular bodies in said first position and said segments contacting the outer surface of said rotatable annular bodies.

7. An apparatus as claimed in claim 6 in which said rotatable annular bodies and said segments present respective portions of a second duct coiled about said first duct and engaged by an outer flexible packing member of heat-shrinkable material wound about said coils; and in which a slot extends over the entire length of said second duct enabling communication between said first and second ducts.

8. An apparatus as claimed in claim 2 including a first slide integral with each of said first supporting elements and first guide means extending parallel to the common axis of said rotatable annular bodies and connected to said first slides; and in which said first actuating means is carried by each of said first slides for moving same along said first guide means and said respective first non-rotatable annular supporting elements between said first and second positions.

9. An apparatus as claimed in claim 8 including second slides supporting a respective one of each of said outer bead transfer units, and second guide means extending parallel to the common axis of said rotatable annular bodies and to the axis of said tire building drum, and connected to said second slides; and in which said third actuating means is carried by each of said second slides.

10. An apparatus as claimed in claim 9 in which said third actuating means comprises a first and a second reversible motor; in which each of said outer bead transfer units is connected to a respective one of said second slides so as to turn in relation to same about said second guide means and, by said first motor, between said third and fourth positions, and so as to travel with said respective second slides along said second guide means by said second motor.

11. An apparatus as claimed in claim 10 in which said rotatable annular bodies present respective outer circumferential grooves, and the segments comprising said ring present respective portions of an inner circumferential groove, with said grooves defining, when said rotatable annular bodies and said segments are arranged in a contacting relationship, with said rotatable annular bodies in said first position and said segments contacting the outer surface of said rotatable annular bodies, a first circular duct for receiving a number of coils of said metal wire.

12. An apparatus as claimed in claim 11 in which said rotatable annular bodies and said segments present respective portions of a second duct coiled about said first duct and engaged by an outer flexible packing member of heat-shrinkable material wound about said coils; and in which a slot extends over the entire length of said second duct enabling communication between said first and second ducts.

13. An apparatus for manufacturing automotive tire beads comprising two inner mobile bead winding units for winding a continuous metal wire to form beads and two outer mobile bead transfer units for housing and gripping the beads after completion of winding; each of the inner bead winding units having a pair of coaxial rotatable annular bodies, a first non-rotatable annular supporting element for each of said rotatable annular bodies, and a pair of first actuating means for moving said two first non-rotatable annular supporting elements between a first position, wherein said two rotatable annular bodies are mated, and a second position wherein said two rotatable annular bodies are axially detached; each of said outer bead transfer units for housing and gripping said beads comprising a second non-rotatable supporting element, a ring comprising a number of segments carried on said second non-rotatable annular supporting element, a second actuating means for moving said segments radially in relation to said second supporting element, and a third actuating means for moving said second supporting element both transversely, between a third position wherein said ring is coaxial with said two rotatable annular bodies, and a fourth position wherein said ring is coaxial with a tire building drum having an axis parallel with the axis of said rotatable annular bodies and offset therefrom, and axially along said tire building drum; each of said rotatable annular bodies being mounted for rotation on a respective one of said first non-rotatable annular supporting elements; and fourth actuating means being provided for rotating said rotatable annular bodies about a common axis in relation to said respective first non-rotatable annular supporting elements.

14. An apparatus as claimed in claim 13 including a first slide integral with each of said first non-rotatable annular supporting elements, and first guide means extending parallel to the common axis of said rotatable annular bodies and connected to said first slides; and in which each of said first actuating means is carried by each of said first slides for moving same along said first guide means and said respective first non-rotatable annular supporting elements between said first and second positions.

* * * * *